United States Patent [19]

Williams

[11] 4,302,962

[45] Dec. 1, 1981

[54] INCLINOMETER TEST ASSEMBLY

[75] Inventor: Henry L. Williams, Oklahoma City, Okla.

[73] Assignee: The Geolograph Company, Oklahoma City, Okla.

[21] Appl. No.: 82,112

[22] Filed: Oct. 5, 1979

[51] Int. Cl.$^3$ ............................................. G01C 25/00
[52] U.S. Cl. ........................................ 73/1 E; 33/365; 33/391; 248/122; 248/188.4; 248/542
[58] Field of Search .................... 73/1 E; 33/391, 365, 33/353; 248/122, 188.2, 188.4, 542

[56] References Cited

U.S. PATENT DOCUMENTS

| | | | |
|---|---|---|---|
| 2,245,646 | 6/1941 | Bullivant | 33/353 |
| 2,765,649 | 10/1956 | Youngclaus | 73/1 E |
| 3,685,162 | 8/1972 | Haun | 33/295 |
| 3,828,436 | 8/1974 | King | 33/353 |

FOREIGN PATENT DOCUMENTS 282675 9/1970 U.S.S.R. ............................... 73/1 E

Primary Examiner—Charles E. Phillips
Attorney, Agent, or Firm—William S. Dorman

[57] ABSTRACT

An inclinometer test assembly comprising a horizontal base plate, a vertical column mounted on the base plate, a support arm pivotally mounted intermediate its ends on the column, the arm having a longitudinally extending recess for receiving the cylindrical body of an inclinometer therein for the purpose of testing the inclinometer, a finger-like clip securing the inclinometer body within the recess, a three-point adjustment for the leveling of the base plate, a pointer plate and a degree plate mounted on the arm and column, respectively, for the positioning of the arm at a predetermined angle relative to the true vertical in order to test the inclinometer.

2 Claims, 5 Drawing Figures

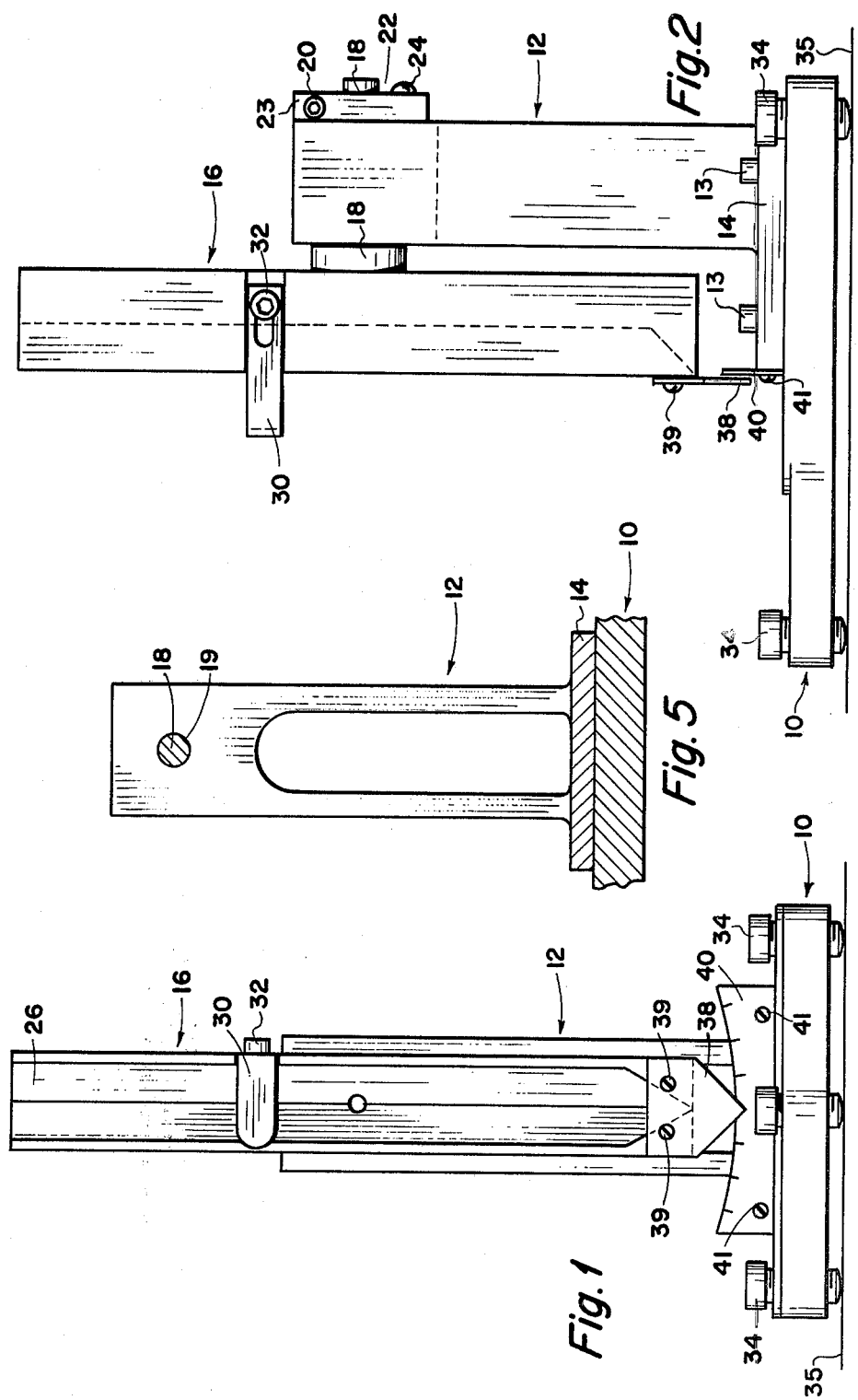

INCLINOMETER TEST ASSEMBLY

BACKGROUND OF THE INVENTION

1. Field of the Invention

This invention relates to a device used for testing the accuracy of an inclinometer. Primarily, this invention is used in the oilfield on rigs by field personnel.

2. Description of the Prior Art

The prior art devices provide no test stand assemblies as such. In the past, inclinometers were variously supported in a true vertical position and were tested in this method.

SUMMARY OF THE INVENTION

A principal object of the invention is to provide a test stand assembly for testing the accuracy of inclinometers in use on oil rigs. This device provides for a true representation of the incline from true vertical of the tested inclinometer.

The inclinometer test assembly comprises a horizontal base plate and a vertical column which is attached to the base plate along its horizontal base. A support arm is pivotally mounted on the column by a pivot shaft. The pivot shaft is affixed to the rear of the arm and is received into the column. The pivot shaft extends through the column and into a U-shaped clamp which is affixed to the rear of the column. A thumb screw passes through the arms of the clamp and is tightened against the pivot shaft to provide a friction grip for the pivot shaft so as to permit the arm to be maintained at different predetermined angular positions relative to the vertical. The support arm has a longitudinally extending recess which provides for the positioning therein of the cylindrical body of the inclinometer. The inclinometer body is secured within the recess by a finger-like clip. The clip is adjustable and is affixed to the arm by a thumb screw.

Three adjustable threaded bolts are vertically received through the base plate and are spaced triangularly about it. Two bubble level plates are affixed to the base plate and positioned at right angles to each other. The bolts and level plates are used in conjunction with each other to provide level positioning of the base plate. A pointer plate with an index mark thereon is mounted at the bottom of the support arm. A calibrated degree plate is mounted on the base of the column and cooperates with the pointer plate to visually indicate the angular disposition of the support arm relative to the vertical. The support arm can be positioned at any angle between 0 and 15 degrees from the vertical so that the accuracy of the inclinometer can be tested over this range.

BRIEF DESCRIPTION OF THE DRAWINGS

FIG. 1 shows a front elevational view of the present invention;

FIG. 2 shows a side elevational view with some hidden parts shown by broken lines;

FIG. 5 is a cross-sectional view taken along line 5—5 of FIG. 4.

DETAILED DESCRIPTION OF THE PREFERRED EMBODIMENTS

Figure 4:
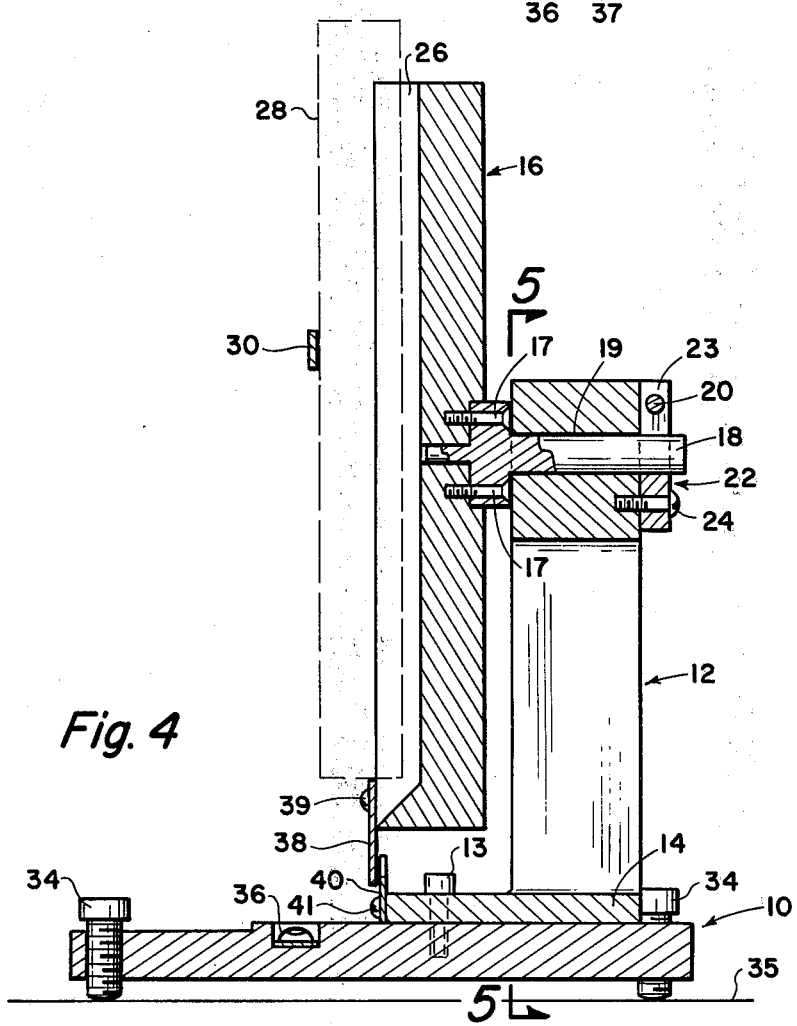
FIG. 4 is a cross-sectional view taken along line 4—4 of FIG. 3.

Referring to the drawings in detail, FIGS. 1 and 2 show an inclinometer test assembly comprising a horizontal base plate 10, and an arched vertical column 12 which is affixed to base plate 10 along a horizontal base 14 of column 12 by means of hex sockets 13. A support arm 16 is pivotally mounted intermediate its ends on column 12 by means of a pivot shaft 18. Pivot shaft 18 is affixed to the rear of arm 16 by four flat-headed screws 17, two of which are shown in FIG. 4. Pivot shaft 18 passes through a suitable hole 19 and is received into column 12. Pivot shaft 18 extends through a U-shaped clamp 22 which is affixed to the rear of column 12 by a screw 24. A thumb screw 20 passes through the arms 23 of clamp 22. By tightening screw 20, the arms 23 of clamp 22 frictionally engage the pivot shaft 18. Arm 16 has a longitudinally extending recess 26 that provides for the positioning of the cylindrical body 28 of an inclinometer therein. An adjustable finger-like clip 30 is affixed to arm 16 by a thumb screw 32. Clip 30 provides a securing means to hold body 28 within recess 26.

Figure 3:
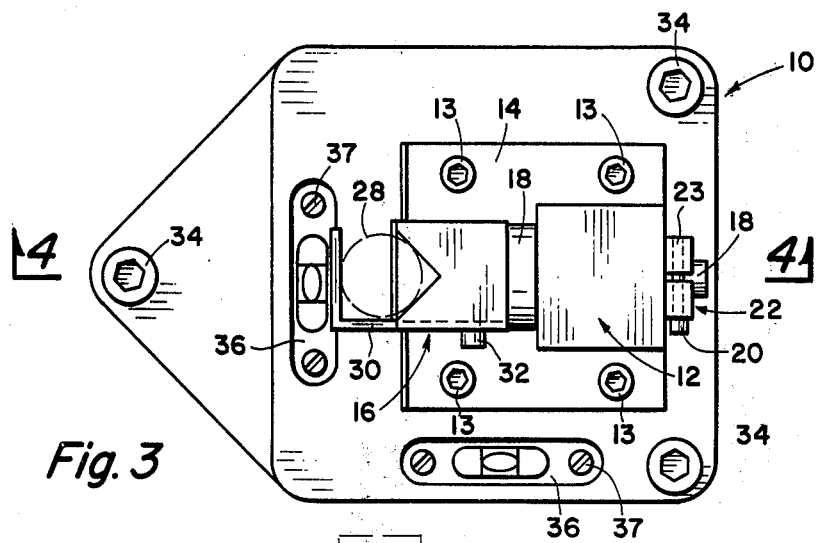
FIG. 3 is a top plan view with the body of an inclinometer shown as a broken circle.

A three-point adjustment or arrangement is provided by bolts 34 spaced triangularly about base plate 10, as shown in FIG. 3. Bolts 34 rest against a surface 35 and a turning force exerted on bolts 34 against surface 35 will raise or lower base plate 10. Two bubble level plates 36 are shown at right angles to each other and are affixed into recesses in base plate 10 by screws 37. Base plate 10 can be leveled by adjusting bolts 34 individually while simultaneously centering the bubbles in the bubble level plate 36.

A pointer plate 38, having an index mark or point thereon, is affixed to the bottom of arm 16 by two screws 39. A degree plate 40 is affixed to base 14 of column 12 by screws 41 and is calibrated to show up to 15 degrees from true vertical. Plates 38 and 40 are used in conjunction with each other to align arm 16 and inclinometer body 28 secured therein at any angle between 0 and 15 degrees.

The details of the inclinometer form no part of the present invention and, hence, are not shown in the drawings. Any one of several different conventional types of inclinometers can be tested with this invention; for the purposes of this explanation, it will be assumed that the inclinometer employed is of the type having a movable paper target adapted to be moved against a pointed plumb-bob. The paper target, as is well known, is marked with concentric circles wherein the center of the target indicates true vertical and the radiating circles represent successive increments of angular deviation relative to true vertical. When the plumb-bob pierces the paper target, the angle (hole) shown on the paper should correspond to the angle of the well bore of an oil well.

When testing an inclinometer using the present test stand assembly, the inclinometer body is secured within the support arm as described. The arm is moved to a predetermined angle relative to the vertical as indicated by pointer 38 relative to the degree plate 40. The inclinometer is triggered such that the target moves upwardly and impinges against the plumb-bob which is hanging in a true vertical disposition. The target is now removed to see if the hole on the paper target corresponds to the angular disposition of the support arm.

The test can be performed at any angle between 0 and 15 degrees relative to the true vertical.

Whereas the present invention has been described in particular relation to the drawings attached hereto, it should be understood that other and further modifications of the invention, apart from those shown or suggested herein, may be made within the scope and spirit of the invention.

What is claimed is:

1. An inclinometer test assembly comprising a horizontal base plate, a vertical column affixed to said base plate, a support arm pivotally mounted intermediate its ends on said column, said arm having a longitudinally extending recess for receiving the cylindrical body of an inclinometer therein for the purpose of testing said inclinometer, means for securing said inclinometer body within said recess, means for leveling said base plate, and means for maintaining said arm in predetermined known positions relative to the true vertical, said pivotal mounting for said arm comprising a pivot shaft rotatably received in said column, said pivot shaft having one end affixed to said arm having an opposite end extending outwardly beyond said column, said means for maintaining said arm in predetermined positions comprising a clamp with a thumb screw extending through said clamp, said opposite end of said shaft being received in said clamp and being frictionally engaged by said clamp upon tightening of said thumb screw.

2. An inclinometer test assembly comprising a horizontal base plate, a vertical column affixed to said base plate, a support arm pivotally mounted intermediate its ends on said column, said arm having a longitudinally extending recess for receiving the cylindrical body of an inclinometer therein for the purpose of testing said inclinometer, means for securing said inclinometer body within said recess, means for leveling said base plate, and means for maintaining said arm inpredetermined known positions relative to the true vertical, said means for leveling said base plate comprising three adjustment bolts triangularly spaced about said base plate, and two bubble levels mounted at right angles to each other on said base plate, said adjustment bolts and said bubble levels being used in conjunction with each other for level positioning of said base plate.

* * * * *